Dec. 6, 1960 J. A. RICKARD 2,963,587
METHOD OF WELL LOGGING
Filed April 29, 1955 2 Sheets-Sheet 1

INVENTOR.
James A. Rickard,
BY
Frank S. Troidl
ATTORNEY.

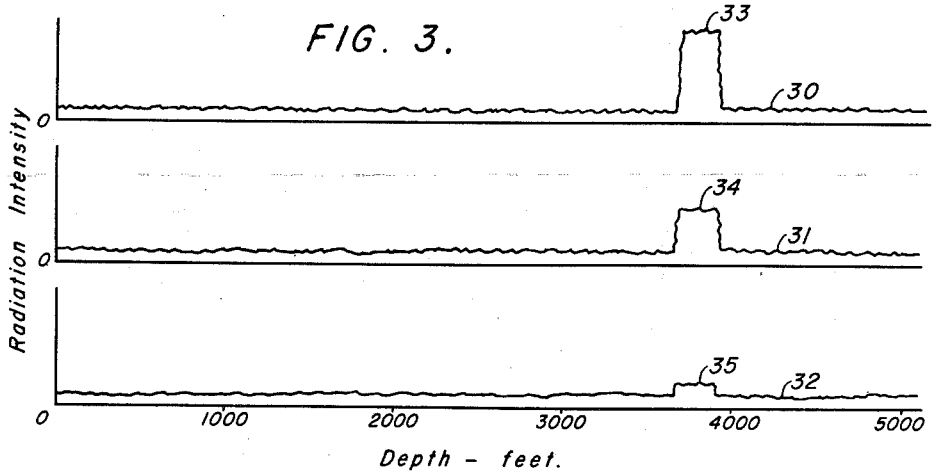
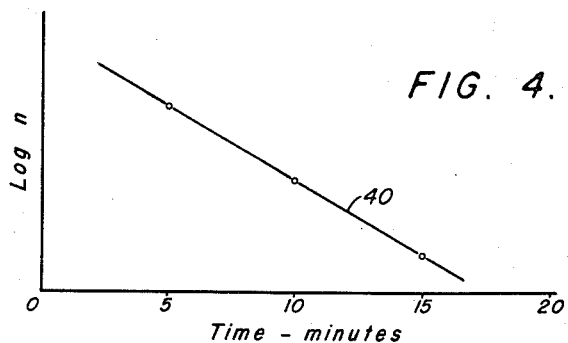
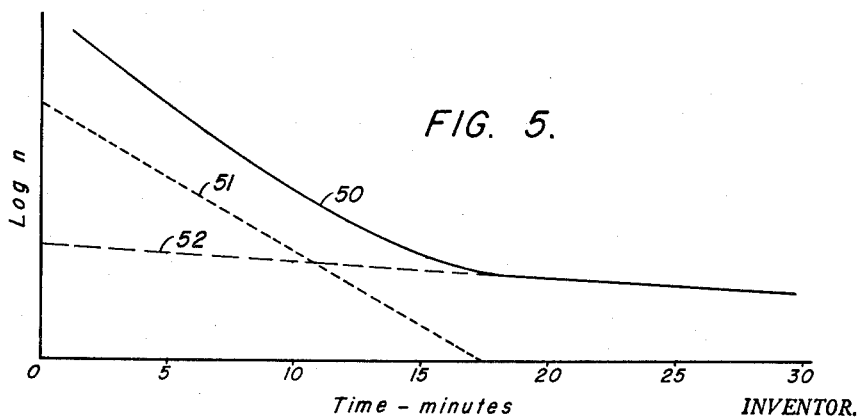

United States Patent Office 2,963,587
Patented Dec. 6, 1960

2,963,587

METHOD OF WELL LOGGING

James A. Rickard, Houston, Tex., assignor, by mesne assignments, to Jersey Production Research Company, Tulsa, Okla., a corporation of Delaware Filed Apr. 29, 1955, Ser. No. 504,825

4 Claims. (Cl. 250—83.6)

This invention relates to well logging. More particularly this invention relates to a novel method and system for determining, by radioactive measurements, the presence of the various chemical elements found within a formation.

In the determination of the radioactivity in subsurface formations at various depths within a borehole, there are basically two (2) types of radiation detected by detectors which are lowered into the borehole; the determination of the natural radioactivity and the determination of the induced artificial radioactivity. Natural radioactivity consists of the radioactive particles which are always emanated from the atoms of certain elements, such as radium, which possess the characteristic of decaying or changing spontaneously. One method of inducing artificial radioactivity consists of bombarding the nuclei of the various elements contained in the subsurface with energy emitted from a source of energy such as a neutron source. The neutrons emitted from the neutron source, which react with the nuclei in the subsurface formations, induce the emission of fast neutrons, slow neutrons and/or gamma rays, some of which impinge upon the detectors, which may consist of either a Geiger-Müller counter, an ionization chamber, a proportional counter, a scintillator or any other well known radioactivity detector. Ideally, the detectors generate a pulse in response to the impingement of each radioactive particle. The pulses are recorded. These recorded logs are commonly known as neutron-neutron logs or neutron-gamma logs.

My new method and system provides a new and improved way, in one of its embodiments, for detecting any one of the desired radiations. In a second embodiment, a method is shown utilizing a plurality of scintillators for detecting with greater accuracy than has formerly been obtained, not only the presence of various elements within the subsurface formation but also gives an indication of the percentage composition of the elements within the subsurface and the depths at which these elements occur. The second embodiment can also be used to detect gammas and neutrons of various energies without the necessity of making one logging run to measure gammas and another logging run for measuring neutrons.

Briefly described, my new system includes a plurality of housings, each containing one detector, located on a cable which is lowered into a borehole. The cable also contains a source of radioactive energy for inducing artificial radiations in the borehole. Each of the housings is lowered successively to a particular depth and the delayed induced radioactivity remaining at that particular depth is measured by each detector. The pulses generated by the detectors are conducted to the surface and recorded.

For purposes herein, by delayed induced radioactivity is meant radiations which take place later than approximately one second after bombardment by the radioactive source.

Other objects and a fuller understanding of the invention may be had by referring to the following description and claims, taken in conjunction with the accompanying drawings in which:

Fig. 3 is a graph showing the type of record which is obtained by utilizing the embodiment of Fig. 1;

Fig. 4 is a graph from which the determination of the half-life of the particular element detected may be determined utilizing my new method and system; and Fig. 5 is a graph showing the type of curve obtained when a plurality of radiations, each of which may have approximately the same energy, are detected.

Figure 1:
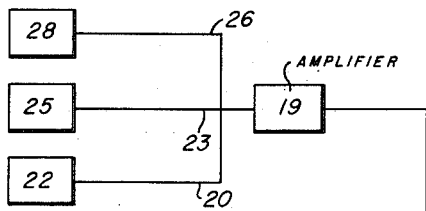
Fig. 1 is a vertical sectional elevation through a borehole containing a well logging instrument embodying the features of the invention.
Figure 1:
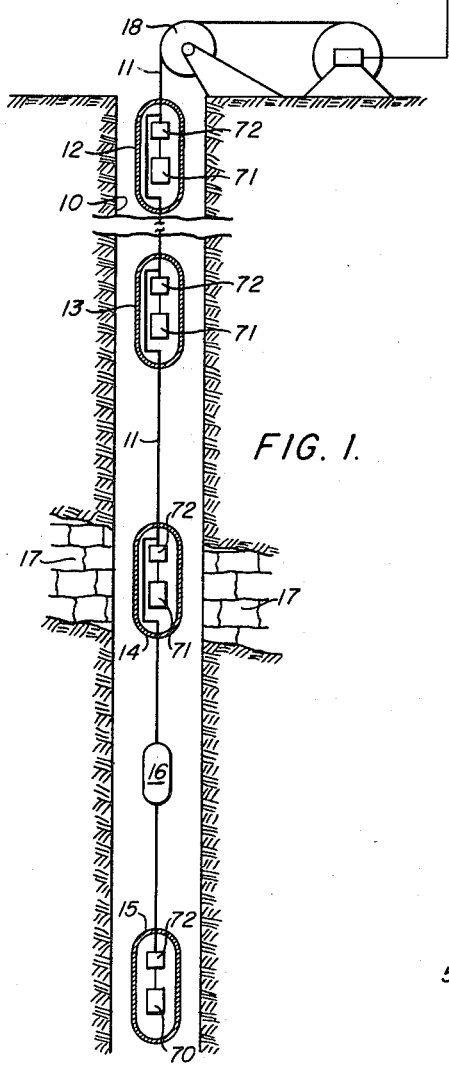

Referring more particularly to the drawings, Fig. 1 shows a borehole 10 into which is lowered a cable 11. Located along the cable 11 are a plurality of housings 12, 13, 14 and 15. Housing 15 has therein a detector 70 which is utilized for measuring the natural radioactivity or "background" of the subsurface formations traversed by housing 15. Detectors 71 in housings 12, 13 and 14 measure the radiations which are induced in the subsurface formation when the nuclei of the elements contained in the subsurface formations are bombarded by energy emitted from the energy source 16. Energy source 16 may be any source of radioactive energy such as a neutron source. Neutron source 16 may consist of radium beryllium or polonium beryllium or particle accelerators such as Cockroff-Walton, Van de Graaff, and linear accelerators or an atomic pile. The detectors in housings 12, 13 and 14, which may be any one of several usable detectors such as a Geiger-Müller counter, an ionization chamber or a proportional counter, detect the induced radioactivity within the formations traversed by each of said detectors. Though three (3) induced radioactivity detector housings are shown in Fig. 1, it is to be understood that any number of detectors may be disposed along the cable 11. Each of the housings 12, 13 and 14 is spaced apart a sufficient distance so as to insure that when one detector, such as detector 71 in housing 14, is measuring the induced radioactivity present in a particular subsurface formation, such as formation 17, the radiations emitted from subsurface formation 17 are not detected simultaneously by a second detector, such as the detector in housing 13. It is an important feature of my new method and system that each detector detects the induced radiations at a particular depth exclusively without appreciable radiations from the same depth being detected by the other detectors. The spacing between each of the detectors utilized for detecting induced artificial radiations may be from a few inches to a few thousand feet, depending upon the energy in electron volts of the induced radiations it is desired to detect.

Cable 11 passes over a measuring device 18, the measuring device serving to give an indication of the depth to which cable 11 has been lowered. The pulses generated by detectors 71, as a result of the induced radiations detected by said detectors, are amplified by amplifiers 72 and conducted through conductors contained in cable 11 through the multi-channel amplifier 19. As an alternative to amplifier 19, a separate amplifier may be used for each housing. The amplified pulses are recorded. A recorder is utilized for each detector. For example, the pulses generated by detector 71 in housing 14 may be conducted through conductor 20 to a recorder 22. The pulses generated by the detector in housing 13 are conducted through conductor 23 to a recorder 25 and the pulses generated by the detector in housing 12 are conducted through conductor 26 to a recorder 28. The number of pulses per unit time is proportional to the radiation intensity.

To facilitate the explanation of my new method and by way of example, let it be assumed it is desired to detect the presence of sulfur within the various formations pierced by the borehole 10. The reaction involved is:

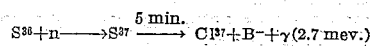

The plurality of housings is lowered into the borehole with housing 15, which is utilized to measure the natural radioactivity within the borehole, preceding the neutron source and the induced artificial radioactivity detectors. As detector 15 is lowered within the borehole adjacent formation 17, the natural radioactivity is recorded. The cable 11 is subsequently lowered to position neutron source 16 adjacent formation 17. The neutrons emitted from neutron source 16 bombard the nuclei of the elements contained in formation 17 and the nuclei of these elements emit induced radiations of various energies. If sulfur is present in formation 17, radiations of a particular energy will be induced. The spacing between natural radioactivity detector 70 and neutron source 16 is sufficiently great to prevent the detection of the neutrons emitted from neutron source 16 directly by detector 70. If desired, a shield, such as a lead shield, may be interposed between neutron source 16 and housing 15. After the neutrons from neutron source 16 have sufficiently bombarded formation 17, housing 14 is then lowered within the borehole to adjacent formation 17. Detector 71 in housing 14 detects all radiations and produces pulses, the number of pulses being approximately proportional to the intensity of said radiations. The pulses are conducted to the surface by means of conductors in cable 11, amplified and recorded on recorder 22. In a similar manner detectors in housing 13 and housing 12 are successively lowered to a point adjacent formation 17 and the intensity of the radiations, present after the time interval between each successive positioning of a detector adjacent a given formation, is recorded.

Fig. 3 shows a type of recording which is obtained by utilizing the embodiment of Fig. 1 to detect the presence of sulfur. In Fig. 3 the radiation intensity is represented on the ordinate and the depth at which these radiations are obtained is represented on the abscissa. The curves shown at 30, at 31 and at 32 represent the record obtained by detectors in housings 14, 13 and 12 respectively minus the "background" record obtained by the detector in housing 15, at a depth of 3800 feet. The time interval between each successive recording is five (5) minutes. As can be seen from an examination of Fig. 3, the intensity of radiations has greatly increased at 33, at 34 and at 35 at 3800 feet, indicating the presence of an element at that depth which has been activated by the neutron bombardment. The element can be identified from a half-life curve to be subsequently described. The amount of the radiation intensity shown at 33 on curve 30, when properly calibrated, gives an indication of the quantity of the element present at 3800 feet.

Fig. 4 shows, in graphical form, a curve which is obtained by noting the time in minutes along the abscissa and the intensity of the induced radiations along the ordinate. As shown on curve 40, the induced artificial radiation intensity decreases with time. From the slope of curve 40 the half-life of the element detected can be determined. In the case of sulfur, this half-life should be about five (5) minutes.

If it should happen that there are radiations from additional induced reactions in formation 17 other than the gammas emitted by the sulfur nuclei, the intensity curve, with respect to time, might look like curve 50 shown in Fig. 5. As indicated in Fig. 5, there are two (2) slopes present in curve 50 which are represented by dotted lines 51 and 52. The slope of dotted line 51 indicates the half-life of sulfur and the slope of dotted line 52 indicates the presence of another element which has a longer half-life than sulfur.

The embodiment shown in Fig. 1 may be utilized with a certain degree of accuracy for the differentiation of one element contained in the subsurface formation from other elements. It has been found, however, that my new method may be practiced with a high degree of accuracy utilizing, as detectors, a scintillator which may consist of an anthracene or sodium iodide crystal, an appropriate photomultiplier tube, and a pulse-height discriminator. The scintillator has many advantages over other radiation detectors, such as the Geiger-Müller counter and the proportional counter. The Geiger-Müeller counter produces a pulse which is of the same order of magnitude regardless of the energy of the detected radiation. In other words, the Geiger-Müller counter will produce a pulse of a certain height if the detected radiation is 2.5 mev. and will produce a pulse of the same amplitude if the radiations detected are greater or less than 2.5 mev. The proportional counter does produce pulses which are proportional to the detected energy but has a relatively long time constant and also has a relatively low efficiency. The scintillator, on the other hand, not only produces pulses which are proportional in height to the energy of the detected radiations but also has a sufficiently short time constant which is of the order of $10^{-9}$ sec. and has a greater efficiency than proportional counters. Hence, by utilizing a combination of a scintillator with a pulse-height discriminator both the intensity of radiations can be ascertained and also the energy in mev. can be determined.

Figure 2:
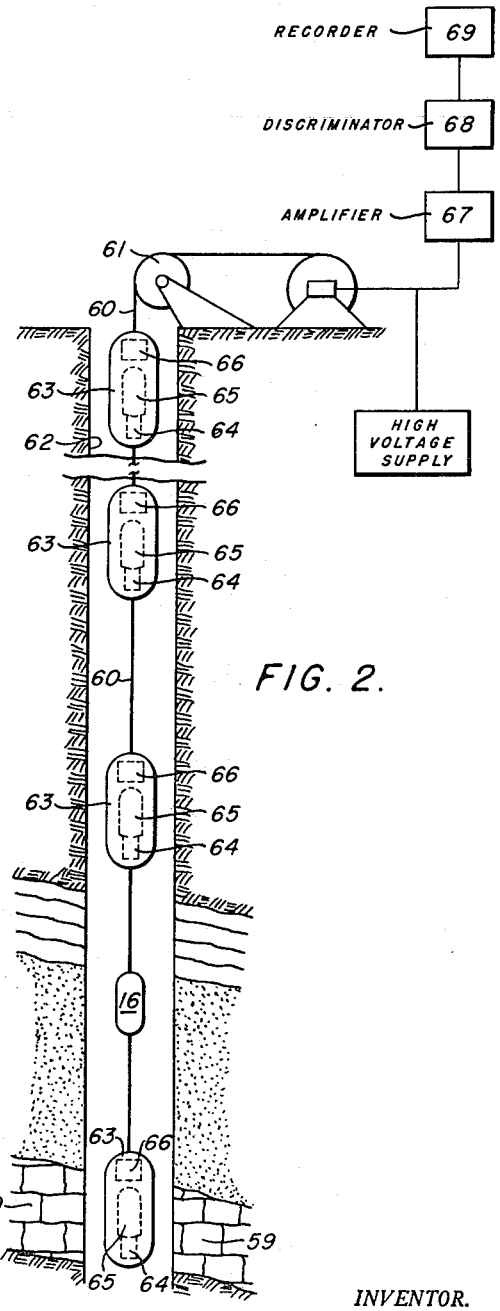
Fig. 2 is a vertical elevation of another embodiment.

Fig. 2 shows a system which may be utilized. As shown in Fig. 2, a cable 60 is lowered over a measuring wheel 61 into the borehole 62. A plurality of housings 63 are located in spaced apart relation along cable 60. Within each housing 63 there is located a crystal 64, a photomultiplier tube 65 and an amplifier 66. The manner of operation of the system shown in Fig. 2 is similar to the operation of Fig. 1. However, when utilizing the embodiment of Fig. 2, the crystals detect radiations having more than one (1) energy range and conduct the plurality of pulses detected by each induced artificial radiation detector 64 to an amplifier 67 and then into a pulse-height discriminator 68.

For the purposes of simplicity only one pulse-height discriminator 68 is shown. However, it is to be understood that a separate pulse-height discriminator is to be utilized for each detector or in the alternative, a pulse-height discriminator having a separate channel for each detector may be employed. The signals within each individual energy range are recorded on recorder 69.

By utilizing the embodiment shown in Fig. 2 and by obtaining a graphical record, such as that shown in Fig. 4, the logging operator has two (2) means for determining the particular elements within a subsurface formation and hence may double check his records. For example, if the predominant element present in subsurface formation 59 (Fig. 2) is sulfur the predominant records obtained should show in graphical form a curve similar to that shown in Fig. 4 and the predominant number of pulses recorded by recorder 69 should be within the energy range of between 2.65 and 2.75 mev.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A method of logging a borehole comprising the steps of bombarding with neutrons the earth formations and fluids contained therein surrounding the borehole, producing by said neutron bombardment new isotopes of the chemical elements of which the formations and contained fluids are composed and simultaneously producing incidental gamma rays which are unwanted and uncounted, said new isotopes being radioactive and decaying after bombardment with characteristic half-lives and emitting gamma rays of energies characteristic of said new isotopes, detecting at a plurality of selected time intervals intensities of said gamma radiation which accompany said decay and which have an energy lying within a preselected energy range, the selection of said time intervals and said energy range being dependent upon the radiation characteristics of the decay of the particular isotopes desired to be detected, and recording the magnitude of the changes in the rate of decay, thereby determining which individual isotopes are present in said formation, the intensities of said detected gamma radiation determining the amount of said individual isotopes present.

2. A method as recited in claim 1 including detecting at said plurality of selected time intervals intensities of gamma radiation which accompany beta decay and which have an energy lying within a preselected energy range.

3. A method of logging a borehole comprising the steps of bombarding with neutrons the earth formations and fluids contained therein surrounding the borehole, producing by said neutron bombardment new isotopes of the chemical elements of which the formations and contained fluids are composed and producing simultaneously incidental gamma rays which are unwanted and uncounted, said new isotopes being radioactive and decaying after bombardment with characteristic half-lives and emitting gamma rays of energies characteristic of said new isotopes, detecting at a plurality of selected time intervals intensities of said gamma radiation which accompany said decay and which have an energy lying within a preselected energy range, the time intervals and energy range selected being dependent upon the radiation characteristics of the decay of the particular isotopes desired to be detected, and producing curves of logarithms of intensities of the gamma radiation detected vs. said selected times at said selected energy levels, the slopes of said resulting curves indicating the presence of said isotopes, the amounts of said isotopes being proportional to the intensities of said gamma radiation.

4. A method as recited in claim 3 including detecting at said plurality of selected time intervals intensities of gamma radiation which accompany beta decay and which have an energy lying within a preselected energy range.

References Cited in the file of this patent

UNITED STATES PATENTS

| | | |
|---|---|---|
| 2,303,688 | Fearon | Dec. 1, 1942 |
| 2,508,772 | Pontecorvo | May 23, 1950 |
| 2,752,504 | McKay | Jan. 26, 1956 |
| 2,776,378 | Youmans | Jan. 1, 1957 |

FOREIGN PATENTS

| | | |
|---|---|---|
| 724,441 | Great Britain | Feb. 23, 1955 |

OTHER REFERENCES

"Scintillation Counter for the Detection of Alpha Particles," by R. Sherr, October 1947; issue of The Review of Scientific Instruments, vol. 18. No. 10.